April 9, 1957 C. B. SADTLER 2,788,090
RETARDER DEVICE

Filed May 26, 1953 2 Sheets-Sheet 1

INVENTOR.
CHESTER B. SADTLER

BY
ATTORNEYS

April 9, 1957     C. B. SADTLER     2,788,090
RETARDER DEVICE

Filed May 26, 1953     2 Sheets-Sheet 2

*INVENTOR.*
CHESTER B. SADTLER

ATTORNEYS

United States Patent Office 2,788,090
Patented Apr. 9, 1957

2,788,090

RETARDER DEVICE

Chester B. Sadtler, Oxnard, Calif., assignor to the United States of America as represented by the Secretary of the Navy Application May 26, 1953, Serial No. 357,650

8 Claims. (Cl. 188—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a retarder device and more particularly to a retarder device employing an arrangement whereby the bending strength of metallic members is utilized for resisting relative movement of components of the device.

The present invention is especially adapted for use in launching missiles wherein booster motors are employed to impart initial acceleration to the missiles. In such cases, it is desirable to provide a means for preventing the booster motor from applying large shock loads to the missile, and accordingly, a retarder device is provided whereby the accelerating force of the booster motor is gradually applied to the missile. One portion of the retarder device is secured to a member which is suitably fixed to the ground or other supporting structure, and another portion of the device is connected to the booster motor. When the booster motor is fired, it will cause that portion of the retarder device which is secured thereto to release from the other components of the device and allow the booster motor and missile to proceed unimpeded in flight. As the retarder device releases, a restraining force is applied to the booster motor which prevents excessive initial acceleration thereof and consequently large shock loads are not applied to the missile.

Prior art devices employ a tapered steel plug which is secured to the booster motor and is forced through a fixed brass tube. The plug is of greater diameter than the tube and consequently sufficient force must be applied to the plug to overcome the friction between the plug and the tube and to expand the tube to allow the plug to pass therethrough. In this manner, a suitable restraining force is applied to the booster motor, the force being dependent on the mechanical properties of the tube and the friction between the plug and the tube. Such devices are therefore disadvantageous since the tube may have directional weaknesses therein which diminish the restraining force, and the amount of frictional resistance between the plug and tube is quite variable. Consequently, the restraining force which such devices will provide cannot be accurately predetermined, often resulting in improper operation of the devices during missile launching. Furthermore, the expendable components of prior art devices are expensive since they require precision machining in the manufacture thereof.

The present invention utilizes an arrangement in which the friction between components thereof is reduced to a minimum and the amount of friction present may be accurately predetermined. The bending strength of metallic members is utilized to provide a restraining force, and since the bending strength of such members is reliable and may be accurately calculated, the restraining force which the invention device provides may be accurately predetermined. Furthermore, the expendable components of the invention device do not require precision machining and are therefore inexpensive to manufacture.

An object of the present invention is the provision of a new and novel retarder device which reduces the friction between components thereof to a minimum.

Another object is to provide a retarder device wherein the restraining force which it will provide may be accurately predetermined.

A further object of the invention is to provide a retarder device which will release at a desired position.

A still further object of the invention is the provision of a retarder device which is simple and inexpensive in construction, yet is sturdy and reliable in operation.

Other objects and many of the attendant advantages of this invention will be readily appreciated as the same becomes better understood by reference to the following detailed description when considered in connection with the accompanying drawings wherein.

Figure 1:
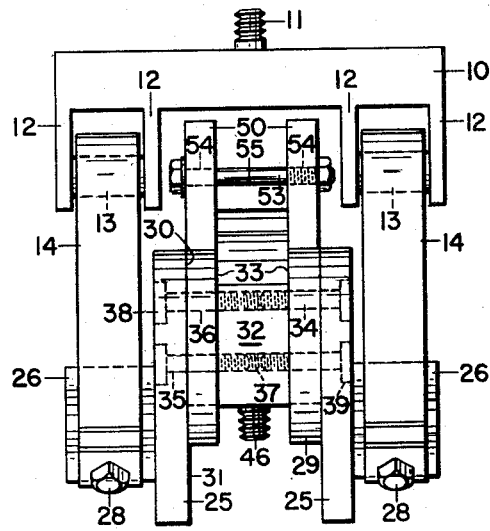
Fig. 1 shows an elevation view of a preferred embodiment of the invention.

Referring now to the drawings, wherein like reference characters designate like or corresponding parts throughout the several views, there is shown in Fig. 1 a yoke or support member 10 which is adapted to be secured by suitable means such as screw threads 11 to a member which is fixed to the ground or other supporting structure. The yoke has four arms 12 extending downwardly therefrom, and two supporting spindles 13 are rigidly supported between adjacent arms at opposite ends of the yoke. Identical connecting members or arms 14 are supported by spindles 13 and as may be more clearly seen in Fig. 2, each of the arms is substantially V-shaped, the apex 15 thereof being formed as a curved portion the inside diameter of which corresponds to the outside diameter of spindles 13 whereby the arms are pivotally mounted upon the spindles and are disposed symmetrically on either side thereof. Arms 14 comprise metallic bars formed of annealed low-carbon steel, brass or other similar moderately ductile metal.

Similar thin flat attaching members 16 are secured to the inside surfaces of opposite end portions 17 of each of the arms 14 by suitable means such as bolts 18, and the attaching members are formed of a suitable ductile metal such as low-carbon steel, brass or the like. Members 16 have an enlarged end portion 19 with an opening 20 extending therethrough, and are bent at an intermediate point thereof to provide a curved portion 21 the purpose of which will be hereinafter more fully described.

Four similar body members 25 have lugs 26 rigidly secured thereto as by welding or the like, the lugs having threaded openings 27 formed therein. The body members are supported upon attaching members 16 by means of bolts 28 which pass through openings 20 and are threaded into openings 27. Identical disk-shaped roller members 29 have one face 30 thereof in abutting relationship with the inner face 31 of each of the associated body members, and like gear segments or toothed members 32 are disposed between the opposite faces 33 of each pair of adjacent roller members. Members 25, 29 and 32 are maintained in proper operative relationship by suitable means such as bolts 34 which pass through openings 35 and 36 provided in members 25 and 29 respectively and are screwed into threaded openings 37 provided in members 32. The heads 38 of bolts 34 lie within recessed portions 39 formed in the body members, and the bolts are longitudinally dimensioned such that a small clearance is provided between the threaded ends of the oppositely facing bolts in each of threaded openings 37 when the device is in assembled position. The assemblies which comprise a pair of body members 25, a pair of roller members 29, and a gear segment 32 will hereinafter be referred to as rotatable units and it is evident that each of these units may be bolted together as shown, or may be secured together by other suitable means such as welding or the like. Furthermore, each of the rotatable units may be formed as a single integral member if desired.

Figure 3:
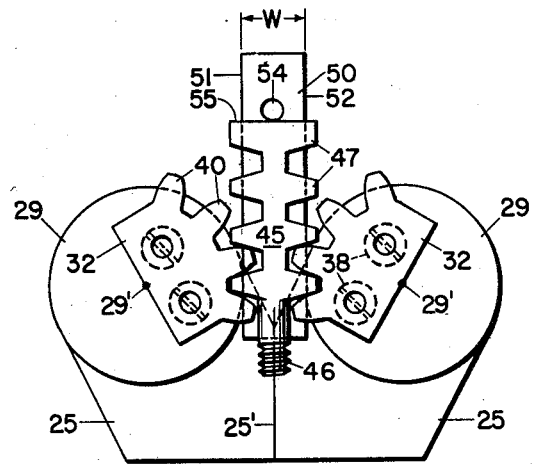
Fig. 3 illustrates the assembly of a portion of the members shown in Fig. 2.

As may be more clearly seen in Fig. 3, each of the gear segments 32 has four teeth 40 formed thereon, and each gear segment is mounted between a pair of roller members 29 such that the circumference of each of the roller members is concentric with and has the same diameter as the pitch circuit of the gear segment attached thereto.

A rack or movable member 45 is adapted to be secured to a booster motor by suitable means such as screw threads 46 and has four teeth 47 formed on opposite faces thereof adapted to mesh with teeth 40 on the gear segments. Although the gear segments and rack member are shown as having four teeth formed thereon, it is obvious that the number of teeth and consequently the pitch thereof may be varied as long as corresponding changes are made in the teeth of both the gear segments and the rack member.

Figure 2:
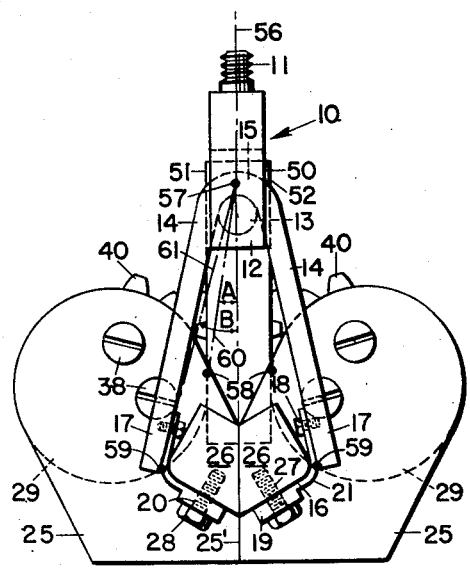
Fig. 2 is a side view of the device shown in Fig. 1 in assembled position with certain hidden members shown in dotted lines.

Figs. 1–3 illustrate the initial assembled position of the device prior to launching the missile, and it may be seen that the lower two teeth on each of the opposite faces of the rack member are in engagement with the lower two teeth of each of the respective gear segments. It should be noted that arms 14 are initially prestressed so as to provide a resilient force tending to urge the opposite ends thereof toward one another thereby causing oppositely facing members 25 to be urged into flush engagement along lateral surfaces 25' thereof and also urging teeth 40 into engagement with teeth 47.

Two flat plates 50 are disposed adjacent opposite lateral portions of rack 45, and opposite faces 51 and 52 of each of the plates are adapted to respectively engage the outer periphery of a roller member of one of the rotatable units and the outer periphery of the adjacent roller member in the other rotatable unit.

The width "W" of members 50 is equal to the distance between the pitch lines of the teeth formed on opposite faces of the rack member. Members 50 may be supported in operative position as shown by suitable means such as a bolt 53 passing through openings 54 formed in the plates, the bolt resting on the end portion 55 of member 45. The bolt assists in keeping members 50 in place during assembly; however, it may be eliminated if desired and the plates will be maintained in assembled position by the resilient action of arms 14. Since the circumference of each of the roller members is concentric with and has the same diameter as the pitch circle of each of the gear segments and the width of member 50 is equal to the distance between the pitch lines of the teeth formed on opposite sides of the rack member, proper engagement of teeth 40 and 47 is assured at all times during operation of the device.

Referring to Fig. 2, the longitudinal axis about which the device is symmetrical is indicated by phantom line 56, and the point of maximum bending moment in member 14 is indicated by reference numeral 57. The points of tangency of roller members 29 and faces 51 and 52 respectively are indicated by reference numeral 58, and numerals 59 indicate the points at which the outward forces developed by teeth 40 and 47 are transmitted to arms 14. A phantom line 60 extends between point 57 and one of points 58 and a phantom line 61 extends between point 57 and one of points 59. An angle "A" is included between lines 56 and 60 and an angle "B" is included between lines 56 and 61. When the device is in initial assembled position, angle "B" must be greater than angle "A" to enable the device to develop bending moments in arms 14 and thereby produce proper functioning thereof.

The operation of the invention device is as follows:

The initial assembled position of the device is shown in Figs. 1–3 and it will be assumed that member 10 is secured to a fixed member and member 45 is secured to a booster motor. When the booster motor is fired, it will cause member 45 to move in a downward direction as seen in the drawings, and teeth 47 on the rack member will cooperate with teeth 40 on the gear segments to rotate each of the rotatable units from the position shown in Figs. 1–3 to the position shown in Fig. 4. As member 45 moves downwardly, the gear segments and roller members will tend to rotate about the centers 29' of members 29, but since the roller members are not free to rotate about their centers, the force exerted by teeth 47 on teeth 40 will be transmitted through body members 25 and lugs 26 to the arms 14 by means of attaching strips 16. As the rotatable units are turned due to the interaction of teeth 47 and 40, attaching strips 16 will slowly be bent outwardly in such a direction as to straighten out curved portions 21 thereof and will transmit an outward force to the arms 14 at a point substantially where curved portions 21 become tangent to the respective arms. Curved portions 21 allow the necessary relative movement of the rotatable units about the ends of arms 14 and transmit the outward force to the arms while preventing the concentration of stresses at any one point in the attaching members.

Figure 4:
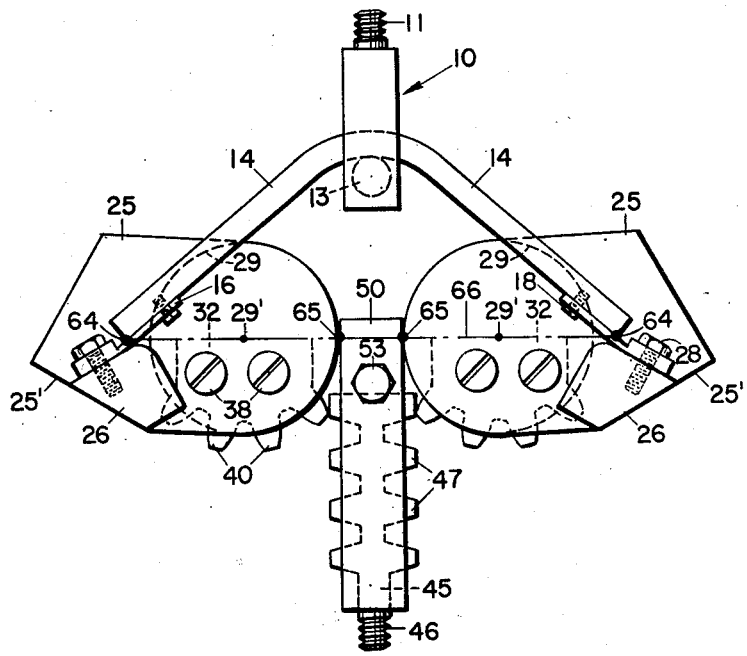
Fig. 4 is a side view of the device shown in Figs. 1–3 upon completion of the retarding operation.

The outward force exerted upon arms 14 will cause the arms to bend and tend to straighten out until they reach the position shown in Fig. 4. The resilient force exerted inwardly by members 14 maintains teeth 40 and 47 in engagement and causes the outer periphery of members 29 to roll along the faces 51 and 52 of members 50. When the device has reached the position shown in Fig. 4, members 16 have been straightened out to the extent that curved portions 21 no longer exist and possibly a slight curvature in the opposite direction may exist in the attaching members. When members 16 have been straightened out, the outward forces are transmitted from members 16 to members 14 substantially at points 64.

In the position shown in Fig. 4, the numeral 65 indicates the points of tangency of the pitch circles of teeth 40 and the pitch lines of teeth 47. When points 64, 29' and 65 are aligned as indicated by phantom line 66, the device offers a minimum of resistance to movement of member 45, and when this condition occurs, the uppermost tooth 47 on either face of member 45 becomes disengaged from the uppermost tooth 40 on each of the gear segments thereby completely releasing member 45 and allowing the missile to proceed in unimpeded flight. When points 64, 29' and 65 are aligned, the resistance to movement of member 45 produced by the device is practically zero since the only resistance to such movement is the force required to bend members 16, and this force is negligible in the present invention.

It is evident that movement of member 45 produces bending moments upon arms 14 which resist such movement, and that therefore the bending strength of the arms determines the amount of restraining force applied to the missile. The bending strength of the arms may be altered by varying the metallic composition of the bars and changing the configuration thereof. Moreover, each arm need not necessarily be formed as an integral member, but may consist of a plurality of members suitably connected to the support member or may comprise a number of laminations such as a leaf spring or the like if desired. In this manner, the amount of restraining force provided by the device and the rate of acceleration of the booster motor when fired may be accurately controlled. The friction between teeth 40 and 47 is very small, and the amount of this friction may be accurately calculated. Furthermore, the tolerances of teeth 40 and 47 are not critical and therefore none of the components of the device require precision machining in the manufacture thereof.

It is apparent from the foregoing that there is provided a new and novel retarder device wherein the friction between components of the device is reduced to a minimum, and the restraining force which the device provides may be accurately predetermined. The device releases at a desired position and is simple and inexpensive in construction, yet is sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A retarder device which comprises a support member, means for connecting said support member to a fixed member, an elongated deformable connecting member supported by said support member, a plurality of attaching members secured to opposite end portions of said connecting member, a body member secured to each of said attaching members, a roller portion supported by each of said body members, a toothed portion supported by said roller portions and having a plurality of teeth formed thereon, a rack member having a plurality of teeth formed thereon engaging the teeth of said toothed portion when said rack portion is in operative position, and means in engagement with said roller portions for maintaining said teeth in properly spaced operative position.

2. A retarder device which comprises a fixed support member, an elongated deformable connecting member supported by said support member, a plurality of attaching members secured adjacent the opposite end portions of said connecting member, said attaching members having a curved portion at an intermediate point thereof to prevent concentration of stresses when under load, a body member secured to each of said attaching members, a substantially disk-shaped roller portion and a gear portion supported by said body member, said gear portion having a plurality of teeth formed thereon, and a movable member having a plurality of teeth formed thereon engaging the teeth of said gear portion when said movable member is in operative position.

3. A device as defined in claim 2 wherein said connecting member is formed of a ductile metallic substance whereby it is deformed when the device is under load.

4. A retarder device which comprises a fixed support member having a plurality of elongated deformable connecting members supported thereby, each of said connecting members having an attaching member secured adjacent opposite ends thereof, each of said attaching members being secured to a body member which supports a substantially disk-shaped roller member, each pair of roller members which are secured to corresponding ends of adjacent connecting members having oppositely facing sides substantially parallel to one another, a toothed member supported by said oppositely facing sides of each pair of roller members, each of said toothed members having a plurality of teeth formed on the outer periphery thereof, a movable rack member having a plurality of teeth formed on opposite faces thereof, at least a portion of said last-mentioned teeth being in engagement with at least a portion of said first-mentioned teeth whereby upon relative movement between said support member and said rack member, said connecting members are deformed and said teeth are disengaged at a predetermined position.

5. A device as defined in claim 4 wherein said connecting members have a substantially V-shaped configuration and are supported at the apex thereof by said support member.

6. A retarder device which comprises a fixed member, a plurality of deformable connecting members supported by said support member, a plurality of attaching members secured to each of said connecting members, a plurality of body members each having a lug formed thereon, each of said attaching members being secured to one of said lugs, each of said body members having a lateral surface adapted to engage a corresponding surface formed on an adjacent body member, a roller member supported by each of said body members, each pair of roller members which are secured to corresponding ends of adjacent connecting members having oppositely facing sides substantially parallel to one another, a toothed member supported by each oppositely facing pair of roller members, said toothed members having a plurality of first teeth formed on the outer periphery thereof, a movable rack member having a plurality of second teeth formed on opposite faces thereof engaging said first teeth when said rack member is in operative position, and a plurality of flat plates disposed adjacent opposite lateral portions of said rack member for maintaining said first and second teeth in properly spaced relationship.

7. A device as defined in claim 6 including means cooperating with said rack member for maintaining said flat plates in proper position.

8. A retarder device which comprises a fixed support member, a plurality of elongated deformable connecting members supported by said support member, said connecting members being formed of a ductile metallic substance and being substantially V-shaped in configuration, an attaching member secured adjacent opposite ends of each of said connecting members and having a curved portion at an intermediate point thereof, each of said attaching members being secured to a body member, a disk-shaped roller member supported by each of said body members, each pair of roller members which are secured to corresponding ends of adjacent connecting members having oppositely facing sides substantially parallel to one another, a gear segment supported by the oppositely facing sides of each pair of roller members, each of said gear segments having a plurality of first teeth formed on the outer periphery thereof, a rack member having a plurality of second teeth formed on opposite faces thereof, a plurality of flat plates disposed adjacent opposite lateral portions of said rack member for maintaining said first and second teeth in properly spaced operative relationship, at least a portion of said first teeth being in engagement with at least a portion of said second teeth whereby upon relative movement between said support member and said rack member, said connecting members are deformed and said teeth are disengaged at a predetermined position.

References Cited in the file of this patent

UNITED STATES PATENTS

| 2,175,516 | Bugatti | Oct. 10, 1939 |

FOREIGN PATENTS

| 542,206 | France | May 13, 1922 |